US012189396B2

(12) United States Patent
Hognaland et al.

(10) Patent No.: US 12,189,396 B2
(45) Date of Patent: Jan. 7, 2025

(54) METHOD AND SYSTEM FOR DETECTING POSITION OF A VEHICLE RELATIVE TO TRACKS THE VEHICLE IS RUNNING ON

(71) Applicant: Autostore Technology AS, Nedre Vats (NO)

(72) Inventors: Ingvar Hognaland, Nedre Vats (NO); Ivar Fjeldheim, Haugesund (NO); Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

(21) Appl. No.: 17/489,355

(22) Filed: Sep. 29, 2021

(65) Prior Publication Data

US 2022/0019232 A1    Jan. 20, 2022

Related U.S. Application Data

(63) Continuation of application No. 16/347,138, filed as application No. PCT/EP2017/077175 on Oct. 24, 2017, now Pat. No. 11,262,765.

(30) Foreign Application Priority Data

Nov. 2, 2016  (NO) .................................. 20161734

(51) Int. Cl.
  *G05D 1/00*  (2024.01)
(52) U.S. Cl.
  CPC .......... *G05D 1/0244* (2013.01); *G05D 1/0212* (2013.01); *G05D 1/0287* (2013.01)

(58) Field of Classification Search
CPC ... G05D 1/0244; G05D 1/0212; G05D 1/0287
See application file for complete search history.

(56) References Cited

U.S. PATENT DOCUMENTS

| 4,379,497 A |   | 4/1983 | Hainsworth et al. |
| 4,593,239 A | * | 6/1986 | Yamamoto ........... G05D 1/0244 318/587 |

(Continued)

FOREIGN PATENT DOCUMENTS

| CN | 101636772 A | 1/2010 |
| CN | 102047076 A | 5/2011 |

(Continued)

OTHER PUBLICATIONS

International Search Report issued in Application No. PCT/EP2017/077175, mailed on Jan. 22, 2018 (5 pages).

(Continued)

*Primary Examiner* — Naeem Taslim Alam
(74) *Attorney, Agent, or Firm* — Baker Botts L.L.P.

(57) ABSTRACT

A vehicle for an automated storage and retrieval system is configured to follow a set route on a track being laid out in the automated storage and retrieval system and having one or more track features. The vehicle includes a first set of wheels capable of moving the vehicle in a first direction; a second set of wheels capable of moving the vehicle in a second direction perpendicular to the first direction; and a plurality of sensors attached to the vehicle and configured to detect track features and to measure a distance to a track feature while the vehicle is moving in the first direction or the second direction.

20 Claims, 2 Drawing Sheets

(56) References Cited

U.S. PATENT DOCUMENTS

| | | | |
|---|---|---|---|
| 4,711,316 | A | 12/1987 | Katou et al. |
| 4,846,297 | A | 7/1989 | Field et al. |
| 6,157,320 | A * | 12/2000 | Yujiri ................. E01F 9/30 |
| | | | 340/901 |
| 6,246,956 | B1 * | 6/2001 | Miyoshi ............. B61L 25/025 |
| | | | 246/182 R |
| 6,285,951 | B1 | 9/2001 | Gaskins et al. |
| 9,896,106 | B1 * | 2/2018 | Wrobel ................. B60W 50/14 |
| 2012/0325979 | A1 * | 12/2012 | Yoon ..................... B61L 1/166 |
| | | | 246/122 R |
| 2015/0260535 | A1 | 9/2015 | Yoshida et al. |
| 2016/0229630 | A1 | 8/2016 | Gebhardt et al. |
| 2016/0272465 | A1 * | 9/2016 | Nakano ..................... B66B 1/30 |
| 2016/0347544 | A1 * | 12/2016 | Kvifte ....................... E06C 7/12 |
| 2017/0123429 | A1 | 5/2017 | Levinson et al. |
| 2019/0047786 | A1 * | 2/2019 | Suzuki .............. H01L 21/67769 |
| 2019/0196500 | A1 | 6/2019 | Harasaki |

FOREIGN PATENT DOCUMENTS

| | | |
|---|---|---|
| CN | 102937812 A | 2/2013 |
| CN | 103985267 A | 8/2014 |
| EP | 1037828 B1 | 9/2003 |
| EP | 3050824 A1 | 8/2016 |
| JP | S62-113210 A | 5/1987 |
| JP | H01-180012 A | 7/1989 |
| JP | H03-290712 A | 12/1991 |
| JP | 2008117204 A | 5/2008 |
| JP | 2014168295 A | 9/2014 |
| JP | 201637192 A | 3/2016 |
| JP | 2016506346 A | 3/2016 |
| JP | 2019-533858 A | 11/2019 |
| NO | 317366 B1 | 10/2004 |
| SU | 880843 A1 | 11/1981 |
| WO | 2014152369 A2 | 9/2014 |
| WO | 2015019055 A1 | 2/2015 |
| WO | 2015029237 A1 | 3/2015 |
| WO | 2015/140216 A1 | 9/2015 |
| WO | 2015180090 A1 | 12/2015 |
| WO | 2015193278 A1 | 12/2015 |

OTHER PUBLICATIONS

Written Opinion issued in International Application No. PCT/EP2017/077175, mailed on Jan. 22, 2018 (8 pages).
International Preliminary Report on Patentability issued in Application No. PCT/EP2017/077175, mailed on Jan. 28, 2019 (17 pages).
Search Report issued in Norwegian Application No. 20161734, mailed on May 11, 2017 (2 pages).
Office Action in counterpart European Patent Application No. 17790755.7 issued on Apr. 20, 2021 (34 pages).
International Search Report issued in Application No. PCT/EP2017/077175, mailed on Jan. 22, 2018 (10 pages).
Office Action issued in Chinese Application No. 201780067540.3; Dated Jul. 15, 2021 (12 pages).
Office Action issued in Japanese Application No. 2019-522289; Dated Sep. 29, 2021 (7 pages).
Manual entitled, "An introduction to the AutoStore system", Jakob Hatteland Computer AS, Jan. 30, 2004, 36 pages, Norway.
Braunl, "Embedded Robotics: Mobile Robot Design and Applications with Embedded Systems" Second Edition, 2006, 17 pages, Springer.
Everett, "Embedded Robotics: Mobile Robot Design adn Applications with Embedded Systems" Second Edition, 2006, 27 pages, CRC Press.
Preliminary Opinion issued in European Application 17790755.7, dated Oct. 18, 2021, (15 pages).
Office Action issued in Chinese Application No. 201780067540.3; Dated Mar. 9, 2022 (12 pages).
D5 Figure 16 ( 2 pages).
Regtien, "Optical Sensors", eccora, ECC3752, Exhibit 27, Sensors for Mechatronics, London, Elsevier Science, 2012 (14 pages).
Morriss, "Automated Manufacturing Systems: Actuators, Controls, Sensors and Robotics", eccora, ECC3752-Exhibit 1—Automated Manufacturing Systems—Actuators, Controls, Sensors and Robotics, New York, 1995 (7 pages).
Fernando, "Distance Imaging and Proximity Sensors". In Bishop, Robert H (ed.). The Mechatronics Handbook (2nd ed.), eccora, ECC3752-Exhibit 4—The Mechatronics Handbook Boca Raton, FL, 2008 (4 pages).
Third Auxiliary Request Claims, marked up copy (2 pages).
Fourth Auxiliary Request Claims, marked up copy (2 pages).
Fifth Auxiliary Request Claims, marked up copy (2 pages).
Sixth Auxiliary Request Claims, marked up copy (2 pages).
Seventh Auxiliary Request Claims, marked up copy (2 pages).
First Auxiliary Request Claims, clean copy (2 pages).
First Auxiliary Request Claims, marked copy (2 pages).
Second Auxiliary Request Claims, clean copy (2 pages).
Second Auxiliary Request Claims, marked copy (2 pages).
Grounds of Appeal filed in European Patent No. EP3535634 dated Jan. 24, 2023 (15 pages).
Office Action issued in the counterpart Japanese Application No. 2022-096396, mailed Aug. 24, 2023 (8 pages).

* cited by examiner

METHOD AND SYSTEM FOR DETECTING POSITION OF A VEHICLE RELATIVE TO TRACKS THE VEHICLE IS RUNNING ON

BACKGROUND

A remotely operated vehicle or robot for picking up storage bins from a storage system is known. A detailed description of a relevant prior art storage system is presented in EP1037828B1, and details of a prior art vehicle being suitable for such a storage system is disclosed in detail in Norwegian patent NO317366B1 and WO2015193278A1. Such prior art storage systems comprise a three-dimensional storage grid containing storage bins that are stacked on top of each other up to a certain height. The storage grid is normally constructed as aluminium columns interconnected by top rails or tracks, onto which a plurality of remotely operated vehicles, or robots, are arranged to move laterally. Each vehicle is equipped with motors for moving the vehicle from one position to another and for driving a lift device adapted for picking up, carrying, and placing bins that are stored in the storage grid. A power supply is supplying power to the motors and drivers comprised in the vehicle, e.g. a rechargeable battery. The vehicle typically communicates with a control system via a wireless link and can be recharged at a charging station when needed.

Rotation of the wheels may be driven by belts connected to the wheels or by individual driving means situated at or at least partly within the wheels. The last example will provide a responsive robot with high control of acceleration and deceleration between a start and a stop position.

When a robot is moving on the tracks, it is controlled to accelerate from a start position and decelerate to a stop position. The start and stop positions will depend on the route set up for a robot prior to picking up a bin from one storage column in the storage grid and placing it in another storage column. A set route of a robot will typically comprise several start and stop positions. A route for a specific robot will be set up by a supervisory system having control of all storage bins and their content as well as the positions of the vehicles handling the bins.

When operating and controlling a robot following a set route relative to tracks laid out on a frame structure forming a grid, it is vital to always keep track of all operating robots and their positions. The positions of a robot can be acquired in different ways. One way is to track the position of the robot relative to the tracks on top of the frame structure. The position can be acquired by means of tracking devices located externally to the robot or by devices integrated in the robot.

JP H03 290712A describes a method for tracking position of a remotely operated trackless vehicle following a set route relative to induction guide paths laid out as floor tiles forming a frame structure. The vehicle has integrated sensors for detecting crossings of the guide paths along a route. Signals are transmitted to a controller for controlling the vehicle according to number of crossings passed.

By using integrated tracking devices, the robot itself will be able to keep track of its position. Integrated tracking devices are however quite complex systems and not necessarily very precise.

There is a need for a simple yet precise way of detecting the position of a robot running on tracks, relative to a frame structure.

According to embodiments of the present invention, the position of the robot is detected by integrated tracking devices tracking the number of crossings passed in x- and y-directions relative to tracks laid out as a grid structure as well as detecting distance to the next track crossing.

SUMMARY

In one aspect, embodiments disclosed herein are defined by a method for tracking the position of a remotely operated vehicle following a set route relative to tracks laid out on a frame structure forming a storage grid, the vehicle having first and second sets of wheels connected to drives for moving the vehicle in corresponding x- and y-directions on the grid, comprising:
  receiving information of a total number of track crossings to pass between start and stop positions in x- and y-directions according to the set route;
  directing sensors attached to the vehicle at the tracks along the route of the vehicle, characterized in that
  at least a first sensor is attached to a wheel support on one side of the vehicle, in the x-direction, and a second sensor is attached to a wheel support on the other side of the vehicle, in the y-direction, and
  detecting and monitoring track crossings passed when moving the vehicle in the x- and y-directions according to the set route by means of wheel supports that are active, enabling contact between wheels and tracks, where the sensors attached to the active wheel supports, are arranged for detecting the track crossings, and the sensors attached to passive wheel supports, are arranged for measuring distance to next track crossing;
  transmitting a signal to a controller, controlling the drives of the wheels of the vehicle, when the number of track crossings passed is close to the total number of track crossings to pass between the start and stop positions in respective x- and y-directions along the set route.

Further features of the method are defined in the dependent claims.

In one aspect, embodiments disclosed herein are also defined by a remotely operated vehicle for tracking the position of the vehicle following a set route relative to tracks laid out on a frame structure forming a storage grid, the vehicle having first and seconds sets of wheels connected to drives for moving the vehicle in corresponding x- and y-directions on the grid, said vehicle comprises:
  means for receiving information of number of track crossings to pass between start and stop positions in x- and y-directions according to the set route,
  sensors attached to the vehicle and directed at the tracks along the route of the vehicle, characterized in that at least a first sensor is attached to a wheel support on one side of the vehicle, in the x-direction, and a second sensor is attached to a wheel support on the other side of the vehicle, in the y-direction, and further comprising:
  means for detecting and monitoring track crossings passed when moving the vehicle in the x- and y-directions according to the set route by means of wheel supports that are active, enabling contact between wheels and tracks, where the sensors attached to the active wheel supports are arranged for detecting the track crossings, and the sensors attached to passive wheel supports, are arranged for measuring distance to next track crossing;
  controller for controlling the drives of the wheels of the vehicle when the number of track crossings passed is close to the total number of track crossings to pass between the start and stop positions in respective x- and y-directions along the set route.

In one embodiment, the at least first and/or second sensors are optical sensors.

Other aspects and advantages of the claimed subject matter will be apparent from the following description and the appended claims.

BRIEF DESCRIPTION OF DRAWINGS

Embodiments of the invention will now be described with reference to the figures, where.

DETAILED DESCRIPTION

In one aspect, embodiments disclosed herein comprise a remotely operated vehicle, hereafter called robot, for tracking the position of the robot following a set route relative to tracks laid out on a frame structure forming a grid.

Figure 1:
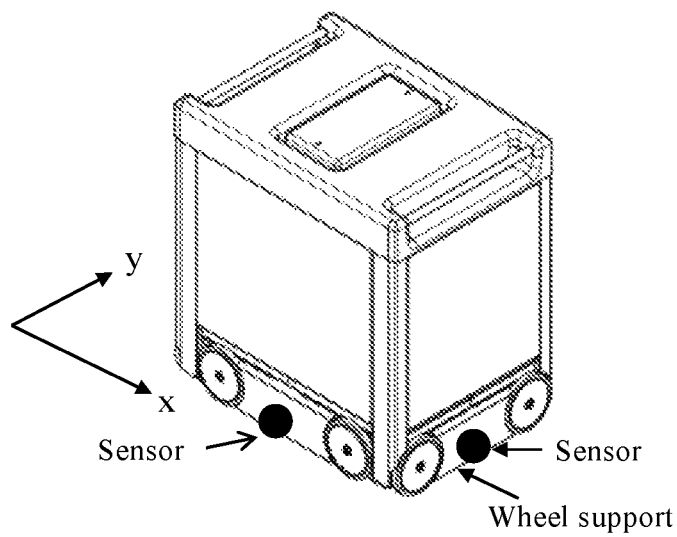
FIG. 1 shows a robot equipped with sensors according to an embodiment of the invention.

FIG. 1 shows an example, in perspective view, of such a robot. The robot having first and second sets of wheels connected to drives for moving the robot in corresponding different direction on the grid. The first and second set of wheels are oriented perpendicular to each other. For the sake of clarity, a Cartesian coordinate system is shown with its x- and y-axes aligned along the principal directions of the rectangular vehicle body.

The robot further comprises means for receiving instructions with information of the number of track crossings to pass between start and stop positions in x- and y-directions according to the set route.

Sensors are attached to the robot and directed at the tracks along the route of the robot. In one embodiment of the invention, the sensors are optical sensors detecting reflection of light from the tracks.

Figure 2:
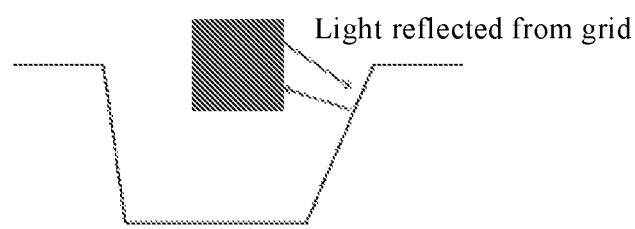
FIG. 2 illustrates how light is reflected from the grid.

FIG. 2 illustrates the principle of using optical sensors as track sensors for detecting the position of a robot relative to tracks and grid structure. Light is reflected from tracks when a robot is moving along the tracks in x- or y-directions. When the robot is passing a track crossing, the reflected intensity of the detected light will change.

In one embodiment of the invention, at least one sensor is attached to one side, running in the x-direction of the robot, and another sensor is attached to the other side, running in the y-direction of the robot. This means that at least one sensor can be active when the robot is moving in either of the x- and y-directions.

In one embodiment of the invention, the sensors are connected to wheel-supports located at each side of the robot. A wheel support will typically hold two wheels, as illustrated in FIG. 1. Active wheel supports enable contact between wheels and tracks. Pair of wheel supports on opposite sides of the robot are active at the same time when they are lowered from the body of the robot into the tracks.

In one embodiment of the invention, optical sensors are used. Other or additional sensors for detecting position of the robot relative to the tracks may also be used, e.g., acoustic sensors. A combination of different types of sensors is feasible.

The remotely operated vehicle further comprises detecting and monitoring means connected to the sensors. This will enable monitoring of track crossings passed when moving the vehicle in the x- and y-directions according to the set route.

The vehicle further comprises a controller for controlling the drives of the vehicle according to the number of track crossings passed. When this is close to the total number of track crossings to pass between the start and stop positions in respective x- and y-directions along the set route, the controller will initiate deceleration of the robot.

In one aspect, embodiments disclosed herein further comprise a method for tracking the position of a remotely operated vehicle or robot following a set route relative to tracks laid out on a frame structure forming a grid. The vehicle having first and second sets of wheels connected to drives for moving the vehicle in corresponding x- and y-directions on the grid. The method comprises several steps.

The first step is receiving information of the number of track crossings to pass between start and stop positions in x- and y-directions according to the set route. This information is passed to the controller of the remote operated vehicle.

The next step is directing sensors attached to the vehicle at the tracks along the route of the vehicle. This is described above and illustrated in FIG. 2.

One embodiment comprises attaching at least one sensor to one side of the robot, i.e. in the x-direction of the robot, and attaching another sensor to the other side, i.e. in the y-direction of the robot, where x- and y-directions of the robot correspond to the x- and y-directions of the grid structure of tracks the robot is moving on.

Another embodiment of the method comprises attaching at least one sensor to a wheel support. By doing this a sensor will be lowered into the track section and will be closer to the track it is directed at when the wheel support it is connected to is active, i.e., contact between wheels and tracks is established.

When a robot is moving along the tracks it will pass one or more crossings on its way from a start position to a stop position.

Figure 3:
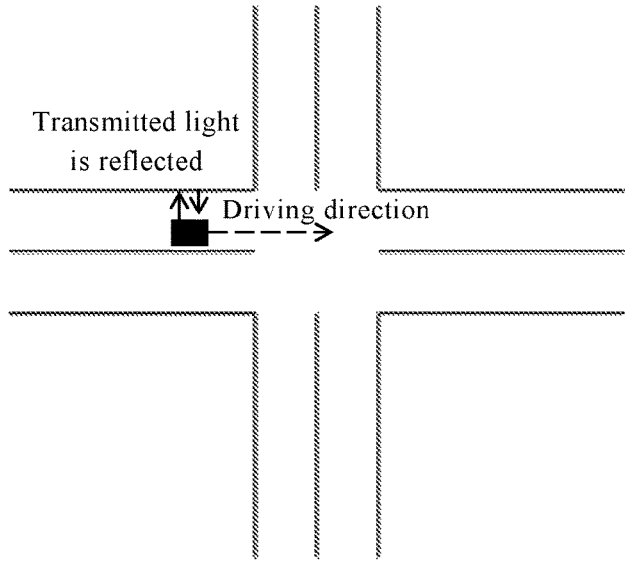
FIG. 3 illustrates the principle of using track sensors for detecting the position of a robot relative to tracks.

FIG. 3 illustrates this principle where a robot equipped with a light sensor receives reflected light from the track. When the robot is moving through a track crossing, the intensity of the light reflected will drop since no light is reflected.

The next step of an embodiment of the invention is detecting and monitoring track crossings passed when moving the vehicle in the x- and y-directions according to the set route. Detection of track crossings is based on measured intensity of reflected light. If other types of sensors are used, the detection is based on detection of change in received signal.

Figure 4:
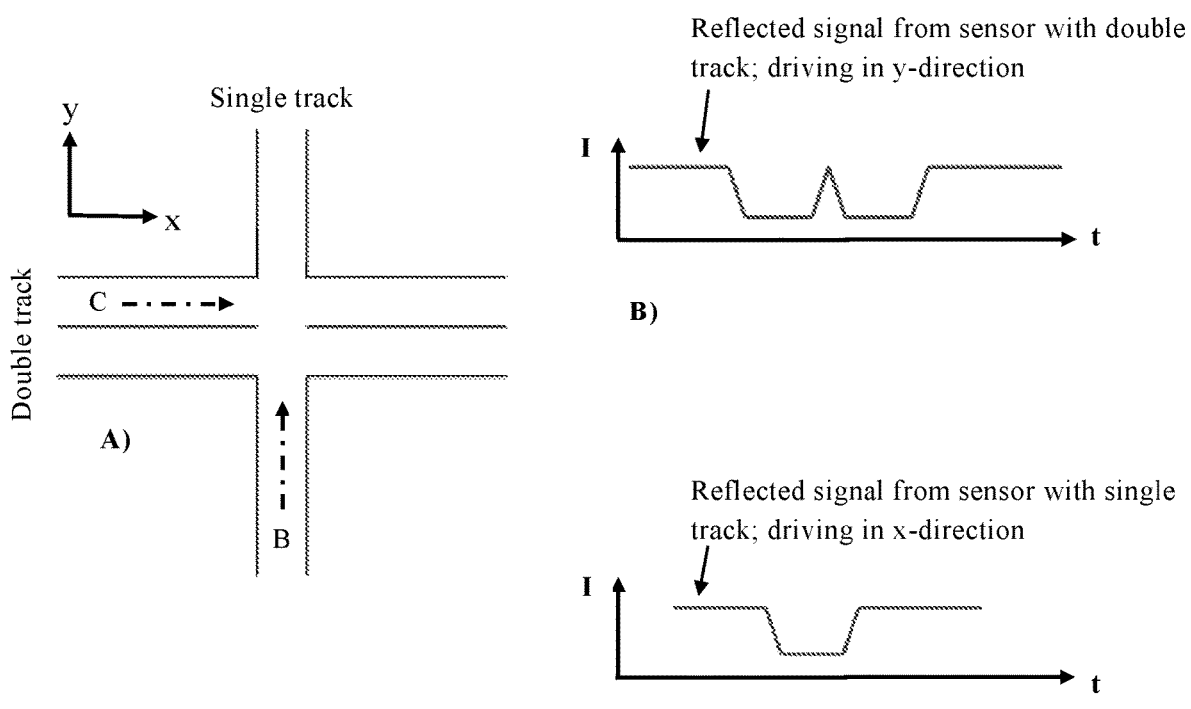
FIG. 4 shows light sensor signals are generated when moving a robot in x- and y-directions of a grid structure.

FIG. 4 shows light sensor signals generated when moving a robot in x- and y-directions of tracks laid out as a grid structure. Based on the sensor signals, the robot is able to keep track on the number of track crossings passed.

FIG. 4A shows an example of a track crossing, where there are double tracks in the x-direction, and single tracks in the y-direction. A robot running in the x-direction will have sensors directed in the y-direction, ref. FIG. 3. It will thus detect the single-track configuration. When the robot is running in the y-direction it will detect the double track configuration. The letters B and C in FIG. 4A are referring to corresponding signals shown in FIGS. 4B and 4C.

FIG. 4B shows light intensity (I) versus time (t) when a robot is running in the y-direction shown in FIG. 4A. As shown in the figure the light intensity will be high if the sensor receives a strong reflected signal from the track it is directed at. When the sensor is passing the track crossing, the signal will drop since a reflected signal is absent. A temporary peak of the intensity of the reflected light will occur due to the double track configuration. After passing the track crossing, the intensity, I, of the reflected signal will become high again until next track crossing.

FIG. 4C shows a similar reflected signal as shown in 4B, but with only one drop in the detected signal due to the single-track configuration.

The last step of this embodiment of the invention is transmitting a signal to a controller, controlling the drives of the wheels of the robot when the number of track crossings passed is close to the total number of track crossings to pass between the start and stop positions in respective x- and y-directions along the set route.

In this way, the controller can control precise deceleration of the robot prior to the next crossing where it is to change direction.

One embodiment of the invention comprises arranging sensors placed on active wheel supports comprising the sets of wheels for detecting track crossings as described above, as well as arranging sensors on passive wheel supports for measuring distance to next track crossing. This can be used for providing an early warning signal, telling the controller that the next track crossing is approaching.

According to one embodiment of the invention, the signal transmitted to the controller can be used for performing precise control of deceleration and acceleration of the vehicle for following a set route along x- and y-directions.

The following describes an example of how the inventive method can be implemented on the remotely operated vehicle described above.

The tracks laid out on a frame structure forming a grid can be addressed similar as the cells in a spreadsheet. If for instance a storage grid comprises 100 columns or cells for storing bins, each cell can be given a unique identity. A grid with 10 cells in the x-direction and 10 cells in the y-direction will make a 2-dimensional track configuration running on top of 100 cells.

When the movements of the robot are controlled, a controller will keep track of which cell the robot is to pick up a bin from, and which cell to place a bin in. Based on this, the controller will set up a route the robot is to follow.

If, for instance, the robot is to pick up a bin from cell C2 and place it in cell H8, and cells C8 and H2 are blocked by other robots, the following route may be set up by the controller. First leg of the route is from C2 to C5, the next leg is from C5 to H5, and the last leg is from H5 to H8. According to said route, the robot must start and stop three times. It will first drive in the y-direction, then the x-direction, and finally in the y-direction. The robot will receive the number of track crossings to pass between each start and stop position according to said route.

The sensors attached to the robot and detecting means comprised in the robot will detect the number of track crossings passed in each direction. When the number of passed crossings is close to the total number of track crossings to pass on each leg, a signal is transmitted to the controller controlling the movements of the robot. In this way, the controller will know exactly when deceleration should start, as well as the rate and duration of acceleration.

According to embodiments of the present invention, the position of the robot is detected by integrated tracking devices for detecting the number of crossings passed in x- and y-directions relative to the tracks laid out as a grid structure is tracked.

The features of the invention can be used in addition to other distance measuring means comprised in the robot or in external means.

This method according to embodiments of the invention will provide a simple yet precise way of detecting the position of a robot relative to a frame structure. This enables fast and efficient movements of robots moving on tracks laid out on top of the frame structure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A vehicle for an automated storage and retrieval system,
wherein the vehicle is configured to follow a set route on a track being laid out in the automated storage and retrieval system and having one or more track features,
wherein the vehicle comprises:
a first wheel support supporting a first set of wheels configured to move the vehicle in a first direction;
a second wheel support supporting a second set of wheels configured to move the vehicle in a second direction perpendicular to the first direction; and
a plurality of sensors attached to the vehicle and configured to detect the one or more track features and to measure a distance to a particular track feature of the one or more track features while the vehicle is moving in the first direction or the second direction, based on intensities of light reflected from different track features of the track, wherein a first one of the plurality of sensors is attached to the first wheel support and a second one of the plurality of sensors is attached to the second wheel support;
wherein the first one of the plurality of sensors attached to the first wheel support is configured to detect the one or more track features when the first wheel support is in an active state, and configured to measure the distance to the particular track feature when the first wheel support is in a passive state.

2. The vehicle according to claim 1, wherein at least two of the plurality of sensors are configured to perform one or more of the detecting or the measuring in different directions while the vehicle is moving in the first direction or the second direction.

3. The vehicle according to claim 1, wherein a third one of the plurality of sensors is configured to detect the one or more track features and to measure the distance to the particular track feature.

4. The vehicle according to claim 1, wherein the first one of the plurality of sensors attached to the first wheel support is configured to detect the one or more track features while the vehicle is moving in the first direction and configured to measure the distance to the particular track feature while the vehicle is moving in the second direction.

5. The vehicle according to claim 1, wherein the second one of the plurality of sensors attached to the second wheel support is configured to detect the one or more track features while the vehicle is moving in the second direction and configured to measure the distance to the particular track feature while the vehicle is moving in the first direction.

6. The vehicle according to claim 3, wherein the third one of the plurality of sensors is configured to detect the one or more track features and measure the distance to the particular track feature while the vehicle is moving in the first direction.

7. The vehicle according to claim 6, wherein the third one of the plurality of sensors is configured to detect the one or more track features and measure the distance to the particular track feature while the vehicle is moving in the second direction.

8. The vehicle according to claim 1, wherein the plurality of sensors comprise an optical sensor.

9. The vehicle according to claim 1, wherein the vehicle further comprises:
 a receiver configured to receive a total number of track features between a start position and a stop position of the set route;
 drives configured to drive the first set of wheels and the second set of wheels; and
 a controller configured to control the drives based on one or more of a number of track features detected or the distance to the particular track feature measured by the first one of the plurality of sensors attached to the first wheel support.

10. The vehicle according to claim 1, wherein at least the first wheel support is operable between the active state in which the first set of wheels are engaged with the track and the passive state in which the first set of wheels are disengaged from the track so as to engage the second set of wheels with the track.

11. The vehicle according to claim 1, wherein at least one of the one or more track features is a track crossing.

12. A method for tracking a position of a vehicle following a set route on a track being laid out in an automated storage and retrieval system and having one or more track features,
 wherein the vehicle comprises:
  a first wheel support supporting a first set of wheels configured to move the vehicle in a first direction;
  a second wheel support supporting a second set of wheels configured to move the vehicle in a second direction perpendicular to the first direction; and
  a plurality of sensors attached to the vehicle and configured to detect the one or more track features and to measure a distance to a particular track feature of the one or more track features while the vehicle is moving in the first direction or the second direction, wherein a first one of the plurality of sensors is attached to the first wheel support and a second one of the plurality of sensors is attached to the second wheel support;
  wherein the first one of the plurality of sensors attached to the first wheel support is configured to detect the one or more track features when the first wheel support is in an active state, and configured to measure the distance to the particular track feature when the first wheel support is in a passive state;
 wherein the method comprises:
  moving the vehicle in the first direction or the second direction while:
   detecting the one or more track features by the first one of the plurality of sensors, based on intensities of light reflected from different track features of the track; and
   measuring the distance to the particular track feature by the first one of the plurality of sensors.

13. The method according to claim 12, wherein the method further comprises:
 determining the position of the vehicle based on a number of track features detected by the first one of the plurality of sensors.

14. The method according to claim 13, wherein the vehicle further comprises:
 a receiver;
 drives configured to drive the first set of wheels and the second set of wheels; and
 a controller configured to control the drives;
 wherein the method further comprises:
  receiving a total number of track features between a start position and a stop position of the set route; and
  controlling the drives of the first set of wheels and the second set of wheels based on the total number of track features and the number of track features detected by the first one of the plurality of sensors.

15. The method according to claim 14, wherein the method further comprises:
 controlling the drives of the first set of wheels and the second set of wheels based on the distance to the particular track feature measured by the first one of the plurality of sensors.

16. The method according to claim 12, wherein the plurality of sensors comprise an optical sensor, and wherein the method further comprises one or more of optically detecting the one or more track features and/or or optically measuring the distance to the particular track feature.

17. The method according to claim 12, wherein
 wherein the method further comprises:
  operating the first wheel support to engage the first set of wheels with the track, such that the vehicle moves in the first direction; and
  operating the first wheel support to disengage the first set of wheels from the track so as to engage the second set of wheels with the track, such that the vehicle moves in the second direction.

18. The vehicle according to claim 1, wherein the different track features of the track comprise a single-track configuration and a double-track configuration.

19. The vehicle according to claim 18, wherein an intensity of light reflected from the single-track configuration is different from an intensity of light reflected from the double-track configuration.

20. The vehicle according to claim 1, wherein a position of the vehicle is determined based on a number of track features detected by the first one of the plurality of sensors attached to the first wheel support.

* * * * *